US012645327B2

(12) United States Patent
Peretz et al.

(10) Patent No.: US 12,645,327 B2
(45) Date of Patent: *Jun. 2, 2026

(54) TOUCHPAD FORCE CALCULATION USING NO-TOUCH CAPACITANCE

(71) Applicant: Microsoft Technology Licensing, LLC, Redmond, WA (US)

(72) Inventors: Ahia Peretz, Elkana (IL); On Haran, Kfar Saba (IL); Lior Zagiel, Tel Aviv (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/087,247

(22) Filed: Mar. 21, 2025

(65) Prior Publication Data

US 2025/0216983 A1 Jul. 3, 2025

Related U.S. Application Data

(63) Continuation of application No. 18/463,572, filed on Sep. 8, 2023, now Pat. No. 12,277,290.

(51) Int. Cl.
*G06F 3/041* (2006.01)

(52) U.S. Cl.
CPC .. *G06F 3/0418* (2013.01); *G06F 2203/04105* (2013.01); *G06F 2203/04107* (2013.01)

(58) Field of Classification Search
CPC .. G06F 3/0445; G06F 3/03547; G06F 3/0418; G06F 2203/04107; G06F 2203/04105; G01L 1/142
See application file for complete search history.

(56) References Cited

U.S. PATENT DOCUMENTS

| | | | | |
|---|---|---|---|---|
| 2005/0061082 | A1* | 3/2005 | Dallenbach | G01L 1/142 73/780 |
| 2010/0024573 | A1* | 2/2010 | Daverman | G06F 3/0443 73/862.626 |
| 2011/0157069 | A1* | 6/2011 | Zhuang | G06F 3/0445 345/174 |
| 2014/0049501 | A1* | 2/2014 | Santos | G06F 3/0446 345/174 |
| 2014/0232691 | A1* | 8/2014 | Lee | G06F 3/0443 345/174 |
| 2020/0319732 | A1* | 10/2020 | Brüninghaus | G06F 3/044 |

\* cited by examiner

*Primary Examiner* — Shaheda A Abdin
(74) *Attorney, Agent, or Firm* — Alleman Hall LLP

(57) ABSTRACT

Methods and computing devices for estimating a force F exerted on a touchpad are disclosed. In one example, a method comprises determining that the touchpad is not being touched. At least on condition of determining that the touchpad is not being touched, a no-touch capacitance value of the PCB is calculated. After calculating the no-touch capacitance value, the method includes determining that the touchpad is being touched. At least on condition that the touchpad is being touched, the no-touch capacitance value and a touch-based capacitance value are used to estimate the force F exerted on the touchpad.

20 Claims, 8 Drawing Sheets

300

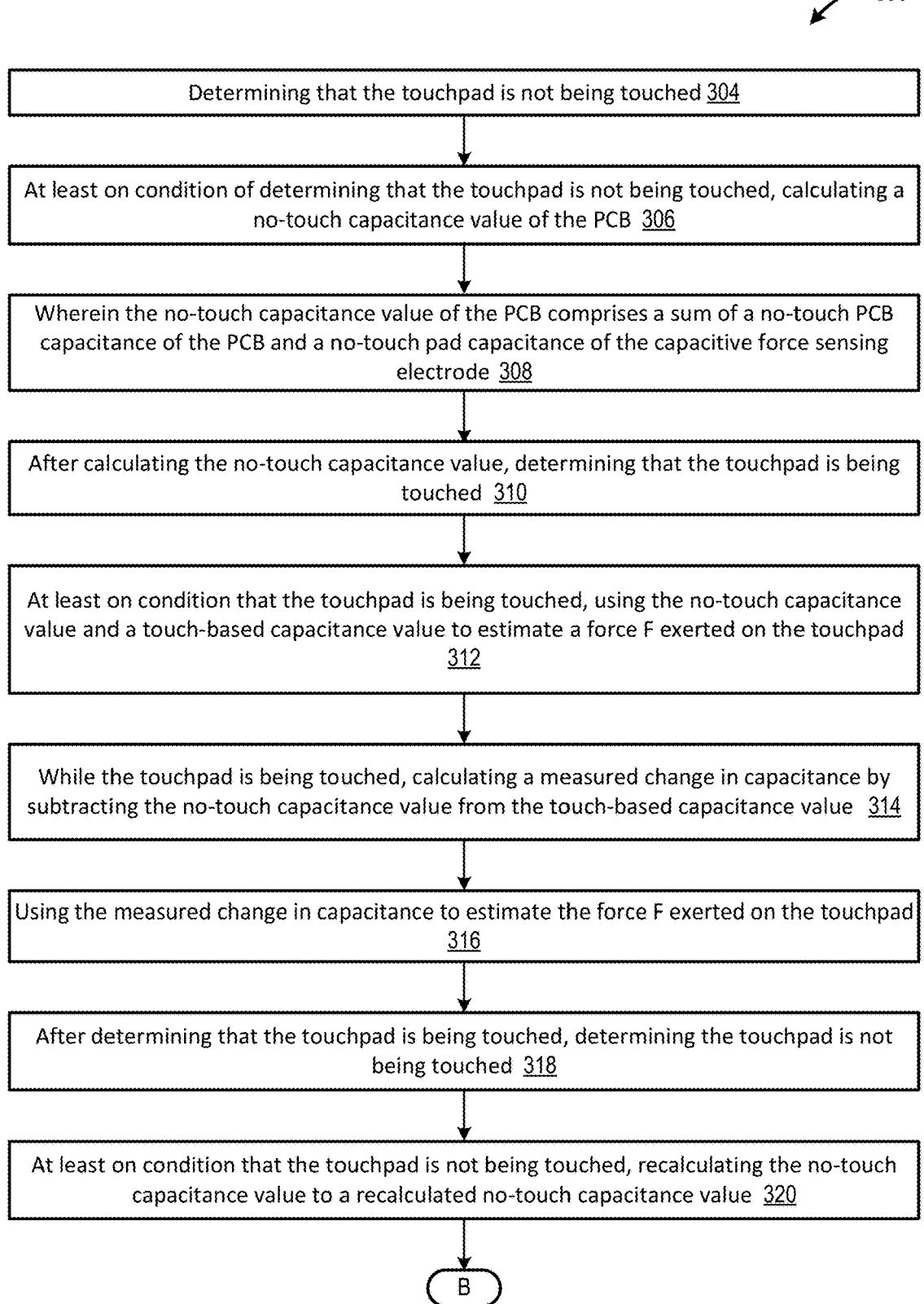

Determining that the touchpad is not being touched 304

At least on condition of determining that the touchpad is not being touched, calculating a no-touch capacitance value of the PCB 306

Wherein the no-touch capacitance value of the PCB comprises a sum of a no-touch PCB capacitance of the PCB and a no-touch pad capacitance of the capacitive force sensing electrode 308

After calculating the no-touch capacitance value, determining that the touchpad is being touched 310

At least on condition that the touchpad is being touched, using the no-touch capacitance value and a touch-based capacitance value to estimate a force F exerted on the touchpad 312

While the touchpad is being touched, calculating a measured change in capacitance by subtracting the no-touch capacitance value from the touch-based capacitance value 314

Using the measured change in capacitance to estimate the force F exerted on the touchpad 316

After determining that the touchpad is being touched, determining the touchpad is not being touched 318

At least on condition that the touchpad is not being touched, recalculating the no-touch capacitance value to a recalculated no-touch capacitance value 320

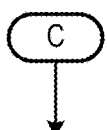

Wherein calculating the calibration factor comprises dividing a known increase in capacitance that results from adding the reference capacitor into the capacitance measuring circuit by a no-touch capacitance change value, wherein the no-touch capacitance change value is calculated by subtracting a no-reference capacitance value measured without the reference capacitor in the capacitance measuring circuit from a reference capacitance value measured with the reference capacitor in the capacitance measuring circuit 336

Multiplying the calibration factor by the touch-based capacitance change value to yield a calibrated touched-based capacitance change value 338

Using the calibrated touch-based capacitance change value to estimate the force F exerted on the touchpad 340

Calculating an environmental change in capacitance at the shielded electrode 342

Using the environmental change in capacitance to adjust the calibrated touch-based capacitance change value to an adjusted calibrated touch-based capacitance change value 344

Wherein using the environmental change in capacitance to adjust the calibrated touched-based capacitance change value comprises subtracting the environmental change in capacitance from the calibrated touched-based capacitance change value 346

Using the adjusted calibrated touch-based capacitance change value to estimate the force F exerted on the touchpad 348

FIG. 6C

TOUCHPAD FORCE CALCULATION USING NO-TOUCH CAPACITANCE

CROSS REFERENCE TO RELATED APPLICATIONS

This application is a continuation of U.S. patent application Ser. No. 18/463,572, filed Sep. 8, 2023, the entirety of which is hereby incorporated herein by reference for all purposes.

BACKGROUND

Some computing devices include a force sensing touchpad for receiving user inputs. In some of these devices, the touchpad utilizes capacitance measurements to estimate a force applied to the touchpad.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

Examples are disclosed relating to computing devices and related methods for estimating a force F exerted on a touchpad in a computing device. In one example, a computing device comprises a force sensing touchpad that includes a base plate comprising a base electrode. A printed circuit board (PCB) is resiliently supported and spaced from the baseplate and comprises a capacitive force sensing electrode. The computing device includes a processor and a memory storing instructions executable by the processor to determine that the touchpad is not being touched. At least on condition of determining that the touchpad is not being touched, a no-touch capacitance value of the PCB is calculated. After calculating the no-touch capacitance value, the instructions are executable to determine that the touchpad is being touched. At least on condition that the touchpad is being touched, the no-touch capacitance value and a touch-based capacitance value are used to estimate a force F exerted on the touchpad.

BRIEF DESCRIPTION OF THE DRAWINGS

FIGS. 6A-6C are a flow chart of a method for estimating a force F exerted on a touchpad according to examples of the present disclosure.

DETAILED DESCRIPTION

Figure 1:
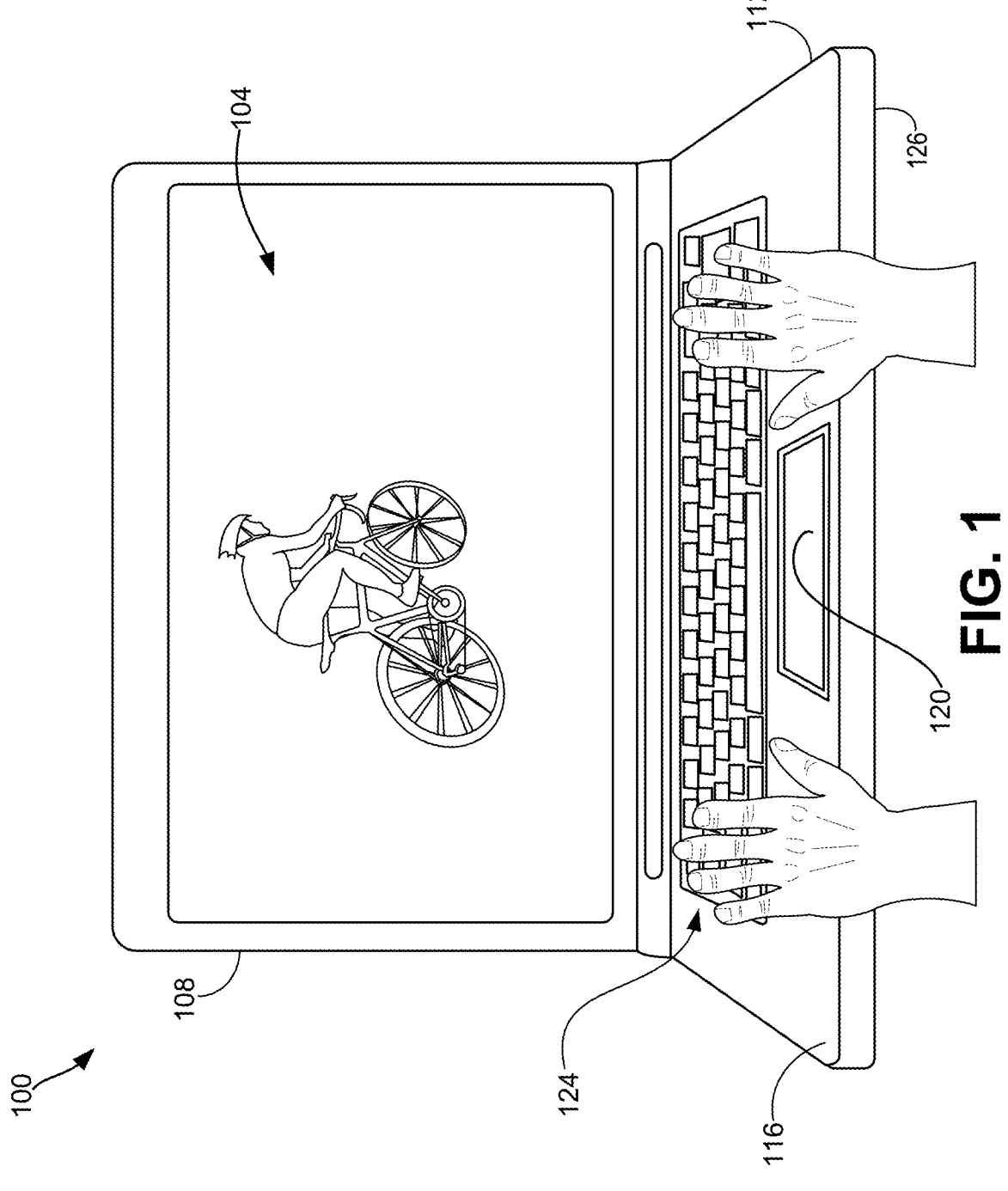
FIG. 1 shows one example of a computing device utilizing a touchpad according to examples of the present disclosure.

Some computing devices include a touchpad for receiving user inputs. In some of these devices, the touchpad utilizes capacitance measurements to estimate a force applied to the touchpad. For example, in some devices a printed circuit board (PCB) is affixed to a cover glass assembly and resiliently supported over a baseplate connected to electrical ground. In some examples, the PCB can be resiliently supported by one or more springs for relative movement toward and away from the baseplate.

One or more sensing pads (electrodes) are located between the PCB and the baseplate. In such implementations, the capacitance between the sensing pads and the grounded baseplate is a function of the distance between the sensing pads and the baseplate.

In these examples, a capacitive force transducer can utilize displacement as a proxy for force. In such a parallel plate capacitor model, the capacitance is equal to the area of the electrode divided by the distance between the sensing pads and the baseplate. When a force applied to the cover glass assembly compresses the spring and reduces this distance, the capacitance changes. In this model, the capacitance is directly proportional to the applied force.

In one example, where the area of an electrode is represented by $A_{pad}$, the initial distance between the electrode and the baseplate is $d_0$, and the change in the distance as a result of a force F applied by a user is $$d(F)=F/K,$$

the capacitance as a result of the Force F is given by the following equation 1.1:

$$\text{Capacitance (Force)} = \varepsilon \frac{A_{pad}}{d_0 - d(F)} = \varepsilon \frac{A_{pad}}{d_0 - \dfrac{F}{K}} \quad 1.1$$

where K is the spring constant of the spring between the PCB and the baseplate, F is the force applied by the user on the touchpad, and $\varepsilon$ is the permittivity of the medium in the gap between the electrode and the baseplate. In this manner, a measured change in capacitance can be used to calculate the magnitude of the applied force F. In different examples, calculating the magnitude of the applied force F can include utilizing one or more formulae, such as equation 1.1, accessing precalculated data such as one or more lookup tables, and various combinations of the foregoing.

In these examples the PCB also can include one or more integrated circuits and corresponding traces that traverse across the PCB. These traces have a base capacitance $C_{pcb}$ with respect to the baseplate. Accordingly, when the touchpad is not being touched by a user's finger, the total capacitance measured by the integrated circuit is given by the following equation 1.2:

$$C(\text{no touch}) = C_{pcb} + \varepsilon \frac{A_{pad}}{d_0} \quad 1.2$$

In some examples, the initial distances between the electrode and the baseplate and between the PCB and the baseplate are determined at the time of manufacturing. Over time, environmental aspects, component wear, device operational aspects, and other factors can cause the initial distances to change. For example, changes in temperature and/or humidity can cause changes in these distances and corresponding capacitance drift. In these examples, continuing to use the initially-determined distances to calculate the force applied on the PCB as a function of the change in capacitance can result in errors. In some examples, temperature and/or voltage changes also can affect one or more amplifiers that amplify signals from the capacitive force sensing electrode, thereby altering the signals produced and corresponding measured capacitances.

Additionally, in some touchpad configurations the small displacements of the PCB and capacitive force sensing electrode caused by a user touching the touchpad correspond to small changes in capacitance. To accurately measure such small changes and the corresponding force applied to the touchpad, measurement resolutions in femto-farads (fF) are desirable. However, the same displacements of the PCB also change the base capacitance $C_{pcb}$ of the PCB, but at a much greater magnitude, such as on the order of pico-farads (pF). Particularly in touchpads with PCBs having electrode(s) with smaller footprints, the large differences between PCB base capacitance changes and capacitive force sensing electrode capacitance changes, coupled with capacitance drift as described above, can make precise force measurements challenging.

Accordingly, and as described in more detail below, configurations of the present disclosure provide touchpad configurations and related methods for estimating a force F exerted on a touchpad that utilize a no-touch capacitance value and a touch-based capacitance value to estimate the force F. In some examples, the no-touch capacitance value is periodically recalculated between touches of the touchpad to accommodate for temperature changes and/or other changes to touchpad components, thereby correspondingly reducing errors associated with such changes. Additionally and as described in more detail below, some example touchpads of the present disclosure include a shielded electrode between two shielding layers that is used to adjust a measured change in capacitance while the touchpad is being touched, and thereby reduce errors in estimated the force exerted on the touchpad.

With reference now to FIGS. 1-4 and 7, an example computing device 100 is illustrated in the form of a laptop computer that includes a force sensing touchpad 120 for estimating a force F exerted on the touchpad according to aspects of the present disclosure. In other examples, force sensing touchpads of the present disclosure can be implemented in tablet computing devices, foldable computing devices including multiple touch screens, wearable and other mobile computing devices, and any other type of computing device that utilizes a touchpad.

In this example computing device 100 includes a touch screen display 104 on a display substrate 108 that is rotatably coupled to a chassis 112. The chassis 112 includes a user interaction surface 116 that comprises a force sensing touchpad 120 and keyboard 124, and an opposing rear cover 126. In different examples a user provides touch inputs to the touchpad 120 by touching the touchpad with one or more digits of the user's hand.

Touchpad 120 is configured to detect the position and force of a user's finger(s) and/or thumb. In some examples the touchpad 120 is a mutual capacitance touchpad. In these examples, touch inputs are identified by sampling capacitance between a driving electrode and a sensing electrode. Driving electrodes are arranged in an array within the touchpad 120. Touch detection signals are provided to each of the electrodes at a different frequency and/or at a different time. Conductive materials, such as a user's finger, draw current away from the driving electrodes when providing a touch input. The touch input can be identified by detecting this current, and a location of the touch input can be reconstructed based at least in part on determining which driving electrodes were being driven when the touch input occurred, and the frequency of the touch detection signal driving each driving electrode. In other examples, touchpads employing other touch detection technologies, including but not limited to self-capacitance and projected capacitance touch detection, can be utilized.

Figure 2:
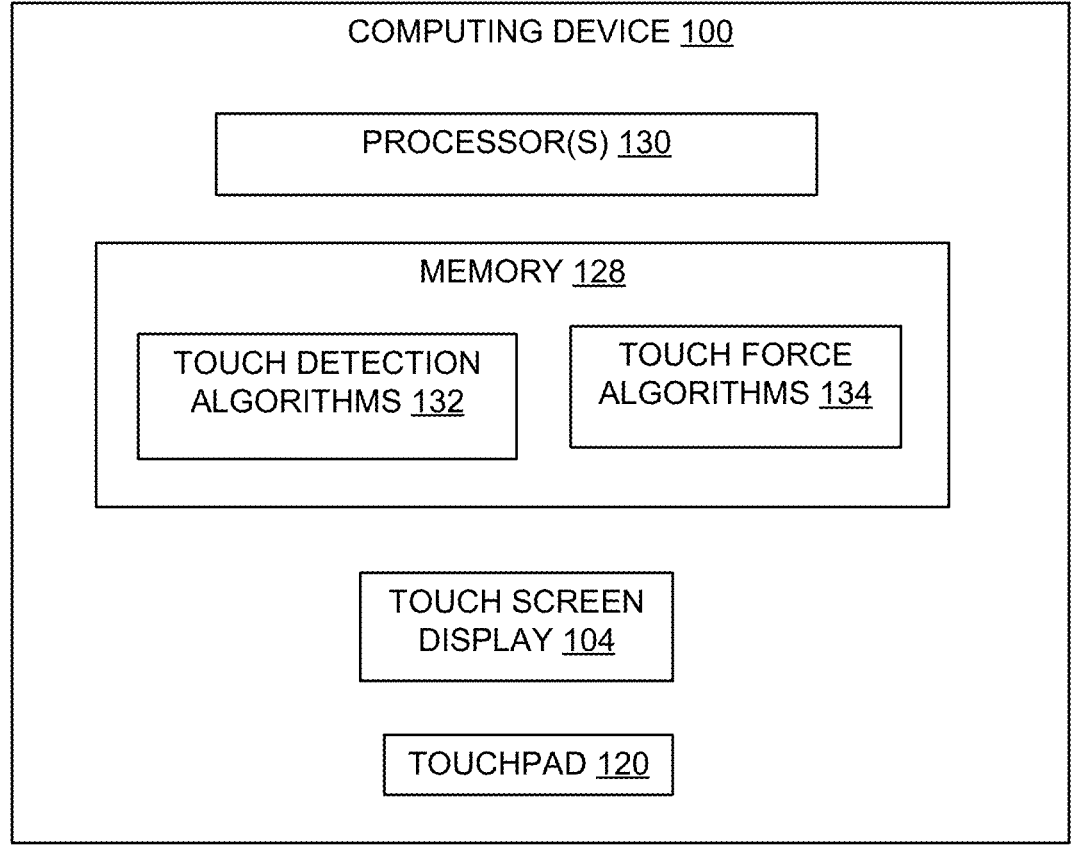
FIG. 2 shows a schematic view of selected components of the computing device of FIG. 1 according to examples of the present disclosure.

With reference now to FIG. 2, a schematic view of selected components of the example computing device 100 of FIG. 1 is provided. Computing device 100 includes memory 128 that stores instructions executable by a processor 130. For example, the memory 128 stores instructions in the form of touch detection algorithms 132 executable by the processor 130 to perform touch detection on the touchpad 120 using signals received from the touchpad. Similarly and as described in more detail below, memory 128 stores instructions in the form of touch force algorithms 134 executable by the processor 130 to determine the force of a touch input on the touchpad 120. Additional details regarding memory 128, processor 130, and other components and subsystems of computing device 100 are described further below with reference to FIG. 7.

Figure 3A:
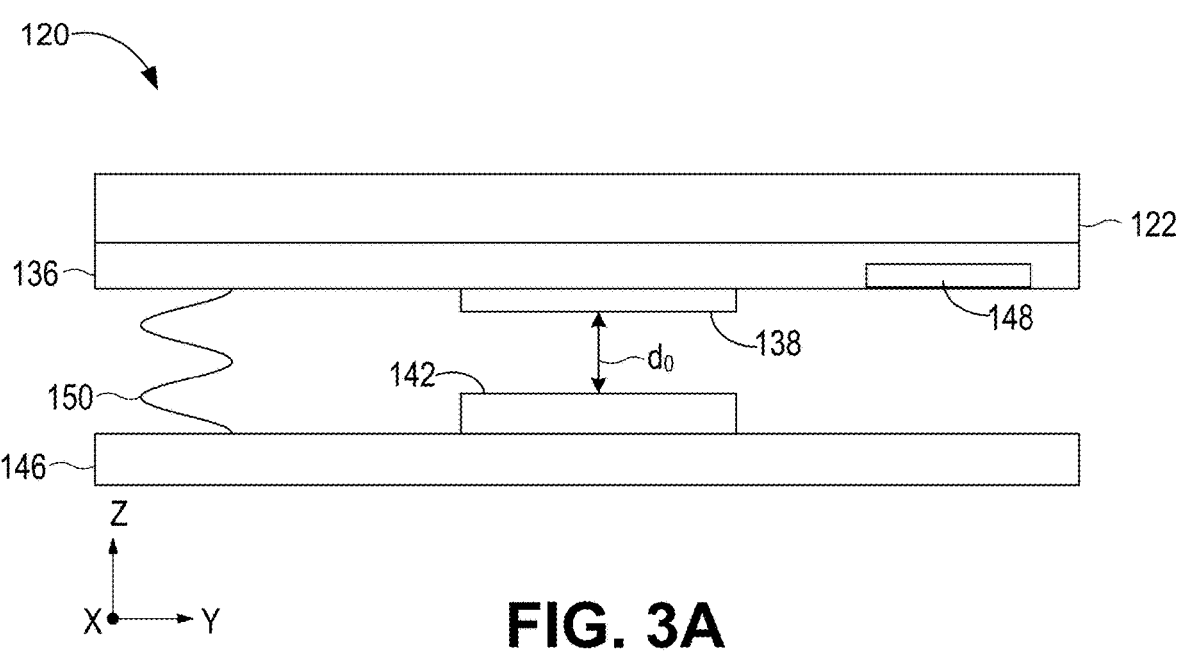
FIGS. 3A and 3B show partial schematic cross sections of the touchpad of FIG. 1.
Figure 7:
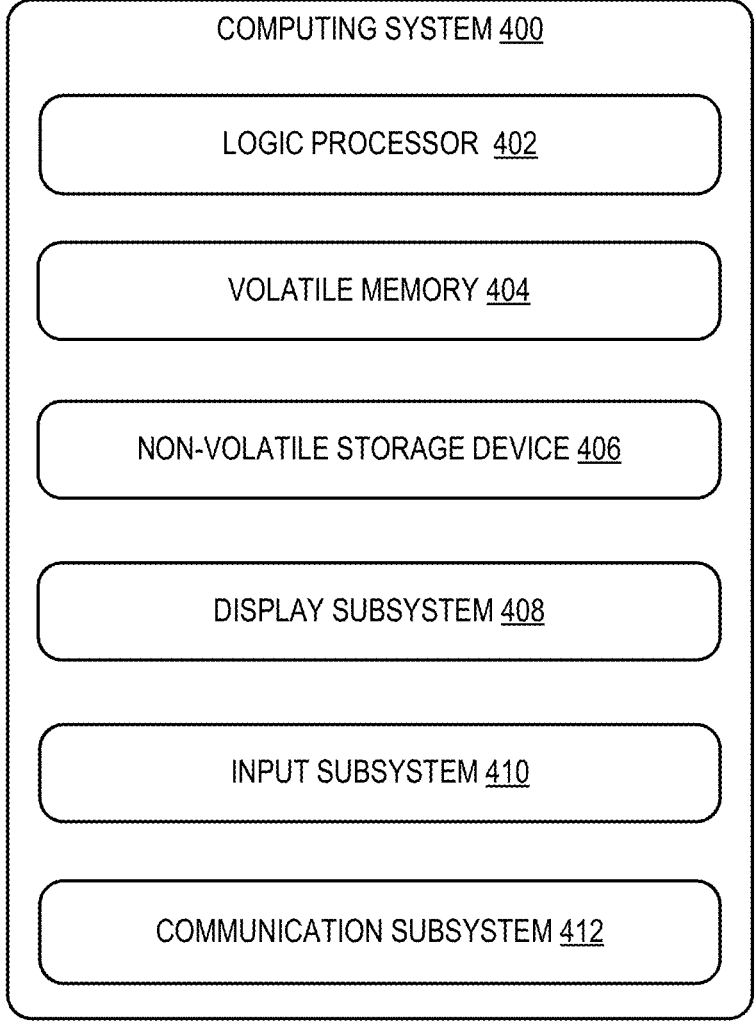
FIG. 7 shows a block diagram of an example computing system according to examples of the present disclosure.

With reference now to FIGS. 3A and 7, in one example touchpad 120 includes a cover glass layer 122 affixed to a PCB 136 by an adhesive layer (not shown). The PCB 136 includes a capacitive force sensing electrode in the form of a PCB electrode 138 that is spaced from a base plate electrode 142 located on a base plate 146 by a distance do. In other examples, touchpads of the present disclosure can include two or more capacitive force sensing electrodes and corresponding base plate electrodes. In some examples, the PCB comprises a flex circuit that includes the capacitive force sensing electrode(s).

As schematically indicated in FIG. 3A, the PCB 136 is spaced from and resiliently supported relative to the base plate 146. In this example a spring 150 resiliently supports the PCB 136 to enable movement toward and away from the base plate 146. In other examples, a variety of other configurations can be utilized to resiliently support the PCB relative to the base plate 146. For example, two or more spring elements may extend between the PCB 136 and base plate 146, and/or the PCB 136 can be affixed at one end and extend over the base plate 146. In different examples the base plate 146 functions as a ground and can comprise a conductive material such as aluminum, a non-conductive material such as plastic, or combinations of the foregoing. In this example the PCB 136 also includes an integrated circuit 148 configured to perform touch detection functionality via the touchpad 120 using a touch sensor pattern in the upper layer of the PCB 136 to sense touch on the cover glass layer 122.

The following examples discuss aspects of the present disclosure in the context of the configuration of FIG. 3. In other examples, a variety of other capacitance-based touchpad configurations can be utilized to practice the techniques of the present disclosure. For example, in some examples a touchpad utilizes differential capacitive sensing. These touchpads include two or more linearly-aligned electrodes that are located at different distances from a corresponding PCB electrode. Because the distances are different, the capacitance between each electrode and its corresponding PCB electrode is also different. This differential capacitance between the electrodes can be used to periodically recalibrate the base height do of the touchpad, regardless of changes in the base height do from its initial value.

As noted above, changes in environmental aspects such as temperature and/or system operations such as supply voltages can adversely affect touchpad capacitance measuring systems and touch forces estimated by those systems. Accordingly, and in one potential advantage of the present disclosure, methods and computing devices are provided for estimating a force F exerted on a touchpad in a manner that compensates for changes in environmental aspects and/or system operations. More particularly and as described in more detail below, configurations of the present disclosure utilize a no-touch capacitance value, calculated when the touchpad is not being touched, along with a touch-based capacitance value determined when the touchpad is touched to estimate the force exerted on the touchpad. Advantageously and in some examples, the no-touch capacitance value is periodically recalculated between touches of the touchpad to accommodate for new temperature changes and/or other changes to touchpad components, thereby continuously calibrating the measurement system to correspondingly reduce errors associated with such changes.

With reference now to FIG. 6A, a flow diagram is provided depicting an example method 300 for estimating a force F exerted on a touchpad in a computing device according to examples of the present disclosure. The following description of method 300 is provided with reference to the touchpad 120 and related components described herein and shown in FIGS. 1-5 and 7. In other examples, the method 300 is performed with other configurations of touchpads and computing devices, and in other contexts using other suitable devices and components.

At 304 and with reference also to FIG. 3A, the method 300 includes determining that the touchpad is not being touched. At 306 the method 300 includes, at least on condition of determining that the touchpad is not being touched, calculating a no-touch capacitance value of the PCB. In different examples, calculating a no-touch capacitance value of the PCB can include utilizing one or more formulae, accessing precalculated data such as one or more lookup tables, and various combinations of the foregoing. As described in more detail below, and in one potential advantage of the present disclosure, calculating (and periodically recalculating) the no-touch capacitance value enables configurations of the present disclosure to calibrate estimations of the force exerted on the touchpad in a manner that adjusts for changes to the baseline no-touch capacitance of the PCB caused by one or more factors described above.

At 308 of the method 300, in some examples the no-touch capacitance value of the PCB comprises a sum of a no-touch PCB capacitance of the PCB CpcbNoForce and a no-touch pad capacitance of the PCB electrode E*Apad/d0. Alternatively expressed and as noted above, in these examples when the touchpad is not being touched by a user's finger, the total capacitance measured by the integrated circuit is given by equation 1.2 above:

$$C(\text{no touch}) = C_{pcbNoForce} + \varepsilon \frac{A_{pad}}{d_0} \qquad 1.2$$

where $C_{pcbNoForce}$ is a baseline no-touch PCB capacitance of the PCB when the touchpad is not being touched (such as the capacitance of the PCB traces), $A_{pad}$ is the area of the PCB electrode, ¿ is the permittivity of the medium in the gap between the electrode and the baseplate, and do is the distance between the PCB electrode and the baseplate. Advantageously, by using the sum of the no-touch PCB capacitance of the PCB $C_{pcbNoForce}$ and the no-touch pad capacitance of the PCB electrode to determine the no-touch capacitance value of the PCB, this value can be utilized to determine a measured change in capacitance ΔC resulting from a user's touch moving the PCB electrode closer to the base plate as described further below.

Figure 3B:
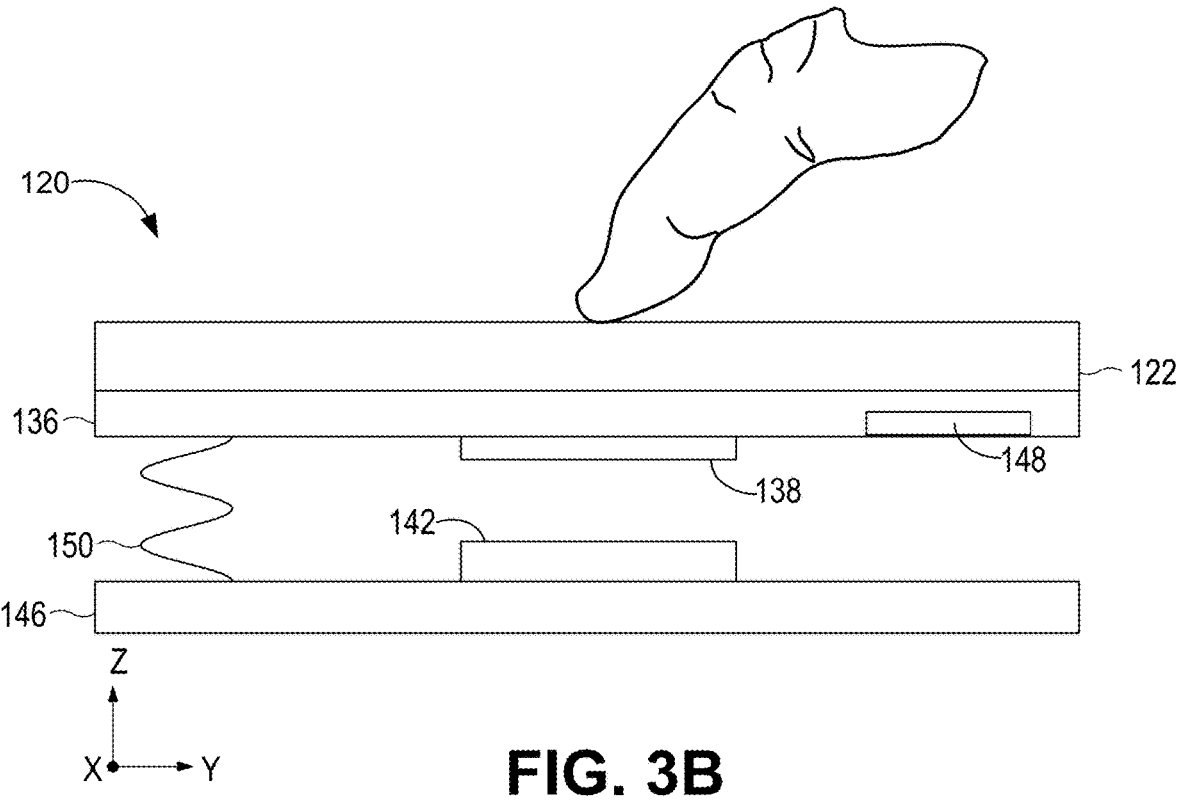

At 310 the method 300 includes, after calculating the no-touch capacitance value, determining that the touchpad is being touched, as schematically illustrated in FIG. 3B. At 312 the method 300 includes, at least on condition that the touchpad is being touched, using the no-touch capacitance value and a touch-based capacitance value to estimate the force F exerted on the touchpad. The touch-based capacitance value can be determined in any suitable manner. In some examples, a touch-based capacitance value C (Force) is the sum of a PCB capacitance of the PCB when the touchpad is being touched and the PCB electrode capacitance when the touchpad is being touched.

In some examples, the no-touch capacitance value C (no touch) and the touch-based capacitance value C (Force) are used to calculate a measured change in capacitance ΔC resulting from the user's touch moving the PCB electrode closer to the base plate. With reference again to FIG. 3A, at 314 the method 300 includes, while the touchpad is being touched, calculating a measured change in capacitance ΔC by subtracting the no-touch capacitance value C (no touch) from the touch-based capacitance value C (Force), per the following equation 1.3:

$$\Delta C = C(\text{Force}) - C(\text{no touch}) \qquad 1.3$$

At 316 and as described further below, the method 300 includes using the measured change in capacitance ΔC to estimate the force F exerted on the touchpad.

In other examples and as described further below, the measured change in capacitance ΔC can be determined in other manners, such as utilizing an additional temperature-stable reference capacitor that is unaffected by changes in temperature and that can be selectively switched into the capacitance measuring circuit of the PCB.

After the touch is detected on the touchpad, the measured change in capacitance ΔC resulting from the user's touch moving the PCB electrode can be utilized to estimate the force F exerted on the touchpad as follows:

$$\Delta C = C_{pcb} + \varepsilon \frac{A_p}{d_0 - \frac{F}{K}} - C_{pcbNoForce} - \varepsilon \frac{A_{pad}}{d_0} \cong \varepsilon A_{pad} \frac{\frac{F}{K}}{d_0 \left( d_0 - \frac{F}{K} \right)} \qquad 1.4$$

The estimated force F can now be extracted as follows:

$$F = K d_0 \left( \frac{\Delta C}{\Delta C + c_{pad0}} \right), \quad C_{pad0} \equiv \varepsilon \frac{A_{pad}}{d_0} \qquad 1.5$$

In some examples, the measured change in capacitance ΔC is much smaller than the no-touch capacitance of the PCB electrode, thereby enabling the following equation 1.6 via linear estimation:

$$F = \frac{K}{\varepsilon A_{pad}} d_0^2 \Delta C \qquad 1.6$$

Accordingly, and in another potential advantage of the present disclosure, determining the force F using equation 1.6 eliminates the PCB base capacitance $C_{pcb}$ from the measurement. Advantageously, by removing the PCB base capacitance $C_{pcb}$ from the calculation, and measuring and utilizing the no-touch capacitance value C (no touch) to determine the measured change in capacitance $\Delta C$, a calibrated estimation of the force F that is unaffected by variations in the PCB capacitance $C_{pcb}$ caused by temperature fluctuations and other causes can be determined.

Additionally, after determining that the touchpad is being touched, the computing device can determine that the user has ceased touching the touchpad. Upon this determination, and in another potential advantage of the present disclosure, the no-touch capacitance value C (no touch) can be recalculated to recalibrate the measuring system and thereby adjust for any new changes to the no-touch capacitance value C (no touch) caused by changes in temperature or other environmental factors or system operations.

Figure 6B:
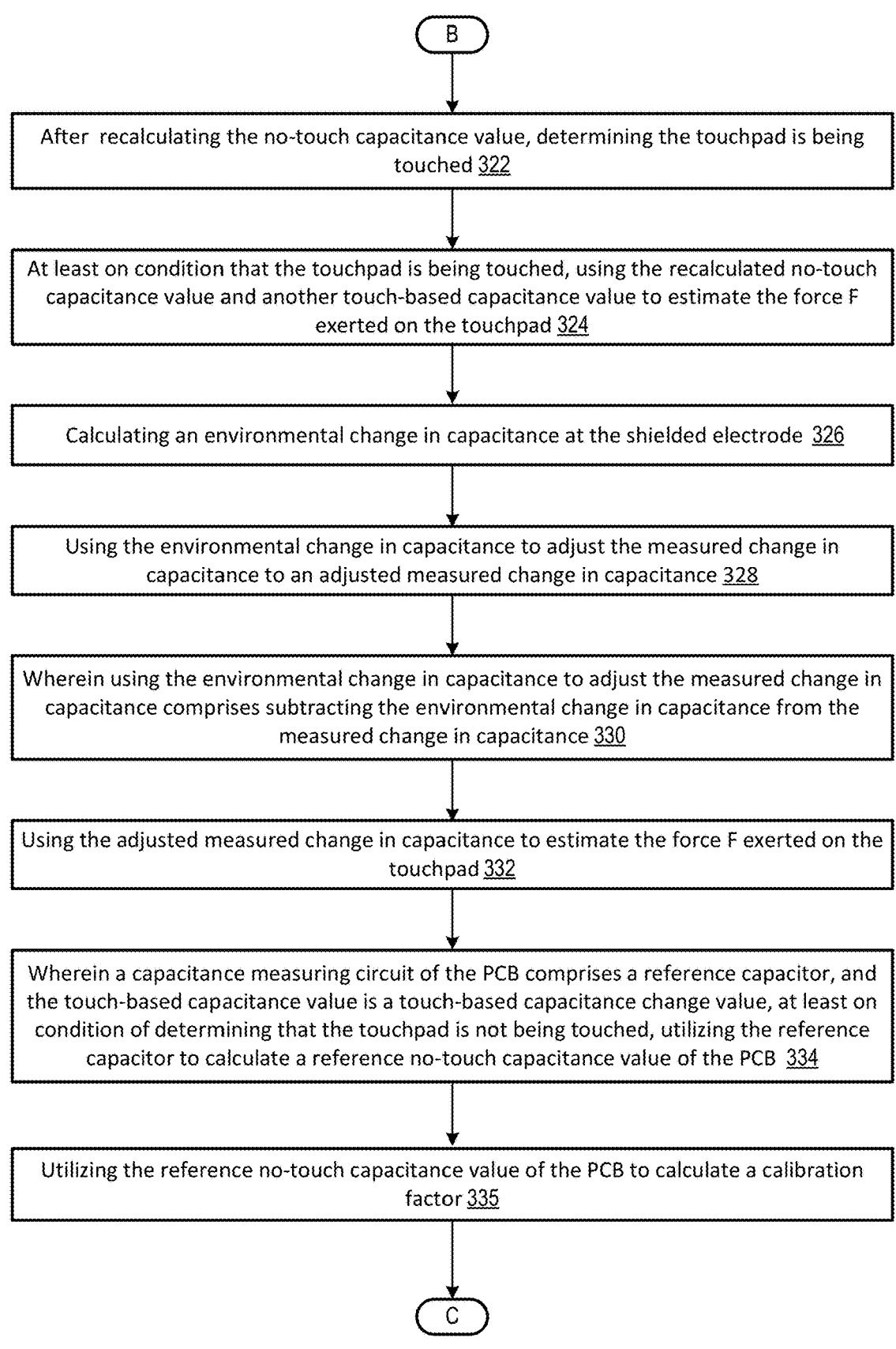

Accordingly and with reference again to FIG. 6A, at 318 the method 300 includes, after determining that the touchpad is being touched, determining the touchpad is not being touched. At 320 method 300 includes, at least on condition that the touchpad is not being touched, recalculating the no-touch capacitance value to a recalculated no-touch capacitance value. With reference now to FIG. 6B, at 322 the method 300 includes, after recalculating the no-touch capacitance value, determining the touchpad is being touched. And at 324 the method 300 includes, at least on condition that the touchpad is being touched, using the recalculated no-touch capacitance value and another touch-based capacitance value to estimate the force F exerted on the touchpad as described above.

Advantageously, by recalculating the no-touch capacitance value C (no touch) when the user ceases touching the touchpad, the measuring system is recalibrated to account for changes in temperature or other environmental factors or system operations that could otherwise skew the measurements and estimated forces. In some examples, the system performs a recalculation of the no-touch capacitance value C (no touch) to update this baseline value each time the user lifts their finger from the touchpad, even for closely-spaced multiple taps separated by, for example, 100 ms.

In some examples, temperature changes within one or more components of the PCB 136 can occur while the touchpad is being touched. In these cases the PCB electrode 138 can experience quickly-changing capacitance drifts that can introduce errors into the touch force F estimations. For example, the temperature of the integrated circuit 148 can rise while the touchpad is being touched due to increased processing loads, thereby causing a capacitance change.

Accordingly, in some examples and in another potential advantage of the present disclosure, the PCB of the touchpad can comprise a shielded electrode having a capacitance that does not change due to movement of the PCB when the touchpad is touched. Additionally, when the touchpad is being touched and the measured capacitance of the PCB electrode is affected by an external factor, such as a temperature change, a humidity change, a variation in a measuring integrated circuit, etc., the capacitance of the shielded electrode is also changed by the same or substantially similar amount due to the external factor. As described in more detail below, and in one potential advantage of the present disclosure, in this configuration the change in capacitance at the shielded electrode can be utilized to adjust the measured change in capacitance $\Delta C$ that is used to estimate the force F exerted on the touchpad.

Figures 4, 5:
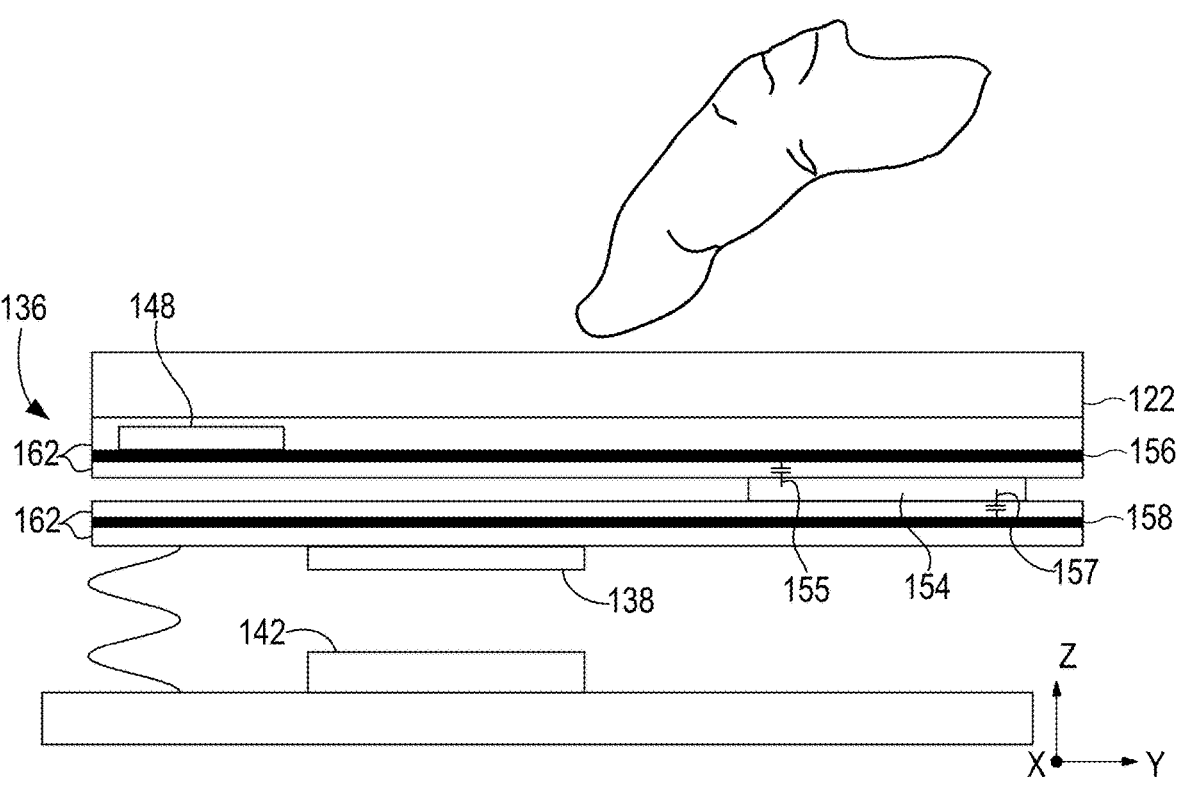
FIG. 4 shows a partial schematic cross section of another touchpad according to examples of the present disclosure.
FIG. 5 shows a portion of a capacitance measuring circuit comprising a reference capacitor that can be used in touchpads according to examples of the present disclosure.

With reference now to FIG. 4, in this example a shielded electrode 154 is sandwiched between a first ground layer 156 and a second ground layer 158 to substantially isolate the shielded electrode from changes in capacitance due to force applied to the touchpad. A first via 155 connects the shielded electrode 154 to the first ground layer 156, and a second via 157 connects the shielded electrode 154 to the second ground layer 158. Insulating layers 162 separate the shielded electrode 154 from other components of the PCB 136. Additionally, to ensure that corresponding changes in capacitance at the shielded electrode 154 and the PCB electrode 138 due to temperature changes are substantially the same, the shielded electrode 154 and the PCB electrode 138 have the same or substantially the same size and structural and electrical properties. In some examples the shielded electrode 154 and the PCB electrode 138 are identical components.

With reference again to FIG. 6B, at 326 the method 300 includes calculating an environmental change in capacitance $\Delta C_{env}$ at the shielded electrode 154. At 328 the method 300 includes using the environmental change in capacitance $\Delta C_{env}$ to adjust the measured change in capacitance $\Delta C$ to an adjusted measured change in capacitance $\Delta C_{adj}$. As noted above, the PCB electrode 138 will experience the same or substantially the same environmental change in capacitance $\Delta C_{env}$, such that the capacitance reading at the PCB electrode when the touchpad is touched will be $\Delta C + \Delta C_{env}$. Because the shielded electrode 154 is isolated from changes in capacitance due to force applied to the touchpad, the capacitance reading at the shielded electrode when the touchpad is touched will be simply $\Delta C_{env}$.

In these examples, at 330 the method 300 includes using the environmental change in capacitance $\Delta C_{env}$ to adjust the measured change in capacitance $\Delta C$ to an adjusted measured change in capacitance $\Delta C_{adj}$ by subtracting the environmental change in capacitance $\Delta C_{env}$ from the measured change in capacitance $\Delta C$. And at 332 the method 300 includes using the adjusted measured change in capacitance $\Delta C_{adj}$ to estimate the force F exerted on the touchpad using the methods described above. Advantageously, in these examples by utilizing a shielded electrode in this manner, the computing device can compensate for quickly-changing capacitance drifts occurring while the touchpad is being touched, and correspondingly adjust the measured changes in capacitance to provide more accurate touch force F estimations.

With reference now to FIG. 5, in some example touchpads of the present disclosure, the integrated circuit 148 is configured to process and convert analog capacitance readings from the PCB electrode into digital readings. Additionally and as noted above, in some examples the measured change in capacitance $\Delta C$ can be determined by utilizing an additional temperature-stable reference capacitor that is unaffected by changes in temperature, and can be selectively switched into the capacitance measuring circuit of the PCB. In the example of FIG. 5 and as described further below, the integrated circuit 148 includes a switching reference capacitor 160 that is stable over changes in temperature. When switched into the capacitance measuring circuit, the reference capacitor 160 increases the measured capacitance by a fixed, known amount $\Delta C_{ref}$ such as 100 fF.

As described in more detail below, the reference capacitor 160 can be selectively added to the circuit and utilized to calculate a no-touch capacitance value of the PCB, such as by calculating a calibration factor. In the example described below, and in another potential advantage of the present disclosure, a calibration factor can be utilized to adjust the touch-based capacitance value to compensate for temperature-induced changes, resulting from ambient temperate, humidity, integrated circuit, and/or other changes, thereby improving the accuracy of the estimates the force F exerted on the touchpad.

As noted above, a touch-based capacitance value is used with a no-touch capacitance value to estimate the force F exerted on the touchpad. In this example, the touch-based capacitance value is a digital touch-based capacitance change value $\Delta Dig_{mes}$ that corresponds to the digital reading of the measured change in capacitance when the touchpad receives a touch.

In this example and with reference again to FIG. 6B, at 334 the method 300 includes, wherein a capacitance measuring circuit of the PCB comprises a reference capacitor, and the touch-based capacitance value is a touch-based capacitance change value, at least on condition of determining that the touchpad is not being touched, utilizing the reference capacitor to calculate a reference no-touch capacitance value of the PCB. In this example, the (non-reference) no-touch capacitance value of the PCB is the digital conversion of the corresponding analog no-touch capacitance value of the PCB C (no touch) without the reference capacitor 160 added into the circuit, given by equation 1.2:

$$C(\text{no touch}) = C_{pcb} + \varepsilon \frac{A_{pad}}{d_0} \qquad 1.2$$

For purposes of the present disclosure, in this example the no-touch capacitance value measured without the reference capacitor 160 added into the circuit is denoted as a digital no-reference no-touch capacitance value $Dig_{noref}$.

Additionally, and also while the touchpad is not being touched, the reference capacitor 160 (that is stable over changes in temperature) is switched into the measuring circuit and a digital reference no-touch capacitance value $Dig_{ref}$ of the PCB is measured. To calculate the calibration factor, the no-touch capacitance value $Dig_{noref}$ is subtracted from the reference no-touch capacitance value $Dig_{ref}$ to yield a no-touch capacitance change value $\Delta Dig$:

$$\Delta Dig = Dig_{ref} - Dig_{noref} \qquad 1.7$$

Next, and with reference again to FIG. 6B, at 335 the method 300 includes utilizing the reference no-touch capacitance value of the PCB to calculate a calibration factor. In this example, a calibration factor Dig2Cap is determined by dividing the known increase in capacitance $\Delta C_{ref}$ added by the reference capacitor 160 by the no-touch capacitance change value $\Delta Dig$:

$$Dig2Cap = \frac{\Delta C_{ref}}{\Delta Dig} \qquad 1.8$$

In another potential advantage of the present disclosure, while the touchpad is not being touched, the calibration factor Dig2Cap can be periodically recalculated to provide updated calibration factors to account for recent changes in temperature.

Accordingly and with reference now to FIG. 6C, at 336 the method 300 includes wherein calculating the calibration factor Dig2Cap comprises dividing a known increase in capacitance $\Delta C_{ref}$ that results from adding the reference capacitor into the capacitance measuring circuit of the PCB by the no-touch capacitance change value $\Delta Dig$, where the no-touch capacitance change value $\Delta Dig$ is calculated by subtracting the no-reference digital measured capacitance value $Dig_{noref}$ measured without the reference capacitor in the capacitance measuring circuit from the reference no-touch capacitance value $Dig_{ref}$ measured with the reference capacitor in the capacitance measuring circuit.

At 338 the method 300 includes multiplying the calibration factor Dig2Cap by the touch-based capacitance change value $\Delta Dig_{mes}$ to yield a calibrated touched-based capacitance change value $\Delta C_{mes}$:

$$\Delta C_{mes} = \Delta Dig_{mes} * Dig2Cap \qquad 1.9$$

At 340 the method 300 includes using the calibrated touch-based capacitance change value $\Delta C_{mes}$ to estimate the force F exerted on the touchpad using equation 1.6 above. Advantageously in these examples, by utilizing a temperature-stable reference capacitor that can be selectively switched into the capacitance measuring circuit of the PCB and utilized to calculate a calibration factor, the calibration factor can be utilized to adjust the touch-based capacitance value to compensate for temperature-induced changes, thereby improving the accuracy of the estimated force F exerted on the touchpad.

As discussed above, in some examples the PCB of the touchpad comprises a shielded electrode having a capacitance that does not change due to a touch force. In one example and with reference again to FIG. 6C, where the PCB 136 comprises a shielded electrode 154 and the integrated circuit 148 includes a switching reference capacitor 160 that is stable over changes in temperature, at 342 the method 300 includes calculating an environmental change in capacitance $\Delta C_{env}$ at the shielded electrode. At 344 the method 300 includes using the environmental change in capacitance $\Delta C_{env}$ to adjust the calibrated touch-based capacitance change value $\Delta C_{mes}$ to an adjusted calibrated touch-based capacitance change value $\Delta C_{mesadj}$. As noted above, the PCB electrode 138 will experience the same or substantially the same environmental change in capacitance $\Delta C_{env}$, such that the capacitance reading at the PCB electrode when the touchpad is touched will be increased by $\Delta C_{env}$. Because the shielded electrode 154 is isolated from changes in capacitance due to force applied to the touchpad, the capacitance reading at the shielded electrode when the touchpad is touched will be simply $\Delta C_{env}$.

In these examples, at 346 the method 300 includes using the environmental change in capacitance $\Delta C_{env}$ to adjust the calibrated touch-based capacitance change value $\Delta C_{mes}$ to an adjusted calibrated touch-based capacitance change value $\Delta C_{mesadj}$ by subtracting the environmental change in capacitance $\Delta C_{env}$ from the calibrated touch-based capacitance change value $\Delta C_{mes}$. And at 348 the method 300 includes using the adjusted calibrated touch-based capacitance change value $\Delta C_{mesadj}$ to estimate the force F exerted on the touchpad using the methods described above. Advantageously, in these examples by also utilizing a shielded electrode in this manner, the computing device can compensate for quickly-changing capacitance drifts occurring while the touchpad is being touched and adjust the measured changes in capacitance to provide more accurate touch force F estimations.

In some embodiments, the touchpads and components described herein may be utilized with a computing system of one or more computing devices. Similarly, the methods and processes described herein may be implemented as a computer-application program or service, an application-programming interface (API), a library, and/or other computer-program product. FIG. 7 schematically shows a non-limiting embodiment of a computing system 400 configured to provide any to all of the compute functionality described herein. Computing system 400 is shown in simplified form.

The laptop computing device 100 described above may comprise computing system 400 or one or more aspects of computing system 400. Computing system 400 may take the form of one or more laptops, personal computers, server computers, tablet computers, home-entertainment computers, gaming devices, mobile computing devices, mobile communication devices (e.g., smart phone), wearable computing devices, and/or other computing devices.

Computing system 400 includes a logic processor 402, volatile memory 404, and a non-volatile storage device 406. Computing system 400 may optionally include a display subsystem 408, input subsystem 410, communication subsystem 412, and/or other components not shown in FIG. 7.

Logic processor 402 includes one or more physical devices configured to execute instructions. For example, the logic processor may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 402 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Volatile memory 404 may include physical devices that include random access memory (RAM). Volatile memory 404 is typically utilized by logic processor 402 to temporarily store information during processing of software instructions. It will be appreciated that volatile memory 404 typically does not continue to store instructions when power is cut to the volatile memory 404.

Non-volatile storage device 406 includes one or more physical devices configured to hold instructions executable by the logic processors to implement the methods and processes described herein. When such methods and processes are implemented, the state of non-volatile storage device 406 may be transformed e.g., to hold different data.

Non-volatile storage device 406 may include physical devices that are removable and/or built-in. Non-volatile storage device 406 may include optical memory (e.g., CD, DVD, HD-DVD, Blu-Ray Disc, etc.), semiconductor memory (e.g., ROM, EPROM, EEPROM, FLASH memory, etc.), magnetic memory (e.g., hard-disk drive, floppy-disk drive, tape drive, MRAM, etc.), and/or other mass storage device technology. Non-volatile storage device 406 may include nonvolatile, dynamic, static, read/write, read-only, sequential-access, location-addressable, file-addressable, and/or content-addressable devices. It will be appreciated that non-volatile storage device 406 is configured to hold instructions even when power is cut to the non-volatile storage device 406.

Aspects of logic processor 402, volatile memory 404, and non-volatile storage device 406 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

When included, display subsystem 408 may be used to present a visual representation of data held by non-volatile storage device 406. As the herein described methods and processes change the data held by the non-volatile storage device, and thus transform the state of the non-volatile storage device, the state of display subsystem 408 may likewise be transformed to visually represent changes in the underlying data. Display subsystem 408 may include one or more display devices utilizing virtually any type of technology. Such display devices may be combined with logic processor 402, volatile memory 404, and/or non-volatile storage device 406 in a shared enclosure, or such display devices may be peripheral display devices.

Input subsystem 410 may comprise or interface with one or more user-input devices such as touchpad 120, keyboard 124, touch screen display 104, a mouse, electronic pen, stylus, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 412 may be configured to communicatively couple various computing devices described herein with each other, and with other devices. Communication subsystem 412 may include wired and/or wireless communication devices compatible with one or more different communication protocols. As non-limiting examples, the communication subsystem may be configured for communication via a wireless telephone network, or a wired or wireless local- or wide-area network, such as an HDMI over Wi-Fi connection. In some embodiments, the communication subsystem may allow computing system 400 to send and/or receive messages to and/or from other devices via a network such as the Internet.

The following paragraphs provide additional support for the claims of the subject application. One aspect provides a method for estimating a force F exerted on a touchpad in a computing device, the touchpad comprising a printed circuit board (PCB) comprising a capacitive force sensing electrode, the method comprising: determining that the touchpad is not being touched; at least on condition of determining that the touchpad is not being touched, calculating a no-touch capacitance value of the PCB; after calculating the no-touch capacitance value, determining that the touchpad is being touched; and at least on condition that the touchpad is being touched, using the no-touch capacitance value and a touch-based capacitance value to estimate the force F exerted on the touchpad. The method may additionally or alternatively include, after determining that the touchpad is being touched, determining the touchpad is not being touched; and at least on condition that the touchpad is not being touched, recalculating the no-touch capacitance value to a recalculated no-touch capacitance value. The method may additionally or alternatively include, after recalculating the no-touch capacitance value, determining the touchpad is being touched; and at least on condition that the touchpad is being touched, using the recalculated no-touch capacitance value and another touch-based capacitance value to estimate the force F exerted on the touchpad. The method may additionally or alternatively include, wherein the no-touch capacitance value of the PCB comprises a sum of a no-touch PCB capacitance of the PCB and a no-touch pad capacitance of the capacitive force sensing electrode. The method may additionally or alternatively include, while the touchpad is being touched, calculating a measured change in capacitance by subtracting the no-touch capacitance value from the touch-based capacitance value; and using the measured change in capacitance to estimate the force F exerted on the touchpad. The method may additionally or alternatively include, wherein the PCB comprises a shielded electrode located between a first shielding layer and a second shielding layer to substantially isolate the shielded electrode from changes in capacitance caused by movement of the PCB, the method further comprising: calculating an environmental change in capacitance at the shielded electrode; using the environmental change in capacitance to adjust the measured change in capacitance to an adjusted measured change in capacitance; and using the adjusted measured change in capacitance to estimate the force F exerted on the touchpad. The method may additionally or alternatively include, wherein using the environmental change in capacitance to adjust the measured change in capacitance comprises subtracting the environmental change in capacitance from the measured change in capacitance. The method may additionally or alternatively include, wherein a capacitance measuring circuit of the PCB comprises a reference capacitor, and the touch-based capacitance value is a touch-based capacitance change value, the method further comprising, at least on condition of determining that the touchpad is not being touched, utilizing the reference capacitor to calculate the no-touch capacitance value of the PCB. The method may additionally or alternatively include, wherein utilizing the reference capacitor to calculate the no-touch capacitance value of the PCB comprises calculating a calibration factor, wherein calculating the calibration factor comprises dividing a known increase in capacitance that results from adding the reference capacitor into the capacitance measuring circuit by a no-touch capacitance change value, wherein the no-touch capacitance change value is calculated by subtracting a no-reference no-touch capacitance value measured without the reference capacitor in the capacitance measuring circuit from a reference no-touch capacitance value measured with the reference capacitor in the capacitance measuring circuit. The method may additionally or alternatively include, wherein the PCB comprises a shielded electrode located between a first shielding layer and a second shielding layer to substantially isolate the shielded electrode from changes in capacitance caused by movement of the PCB, the method further comprising: calculating an environmental change in capacitance at the shielded electrode; using the environmental change in capacitance to adjust a calibrated touch-based capacitance change value to an adjusted calibrated touch-based capacitance change value; and using the adjusted calibrated touch-based capacitance change value to estimate the force F exerted on the touchpad. The method may additionally or alternatively include, wherein using the environmental change in capacitance to adjust the calibrated touched-based capacitance change value comprises subtracting the environmental change in capacitance from a calibrated touched-based capacitance change value.

Another aspect provides a computing device, comprising: a force sensing touchpad comprising: a base plate comprising a base electrode; and a printed circuit board (PCB) resiliently spaced from the baseplate and comprising a capacitive force sensing electrode; a processor; and a memory storing instructions executable by the processor to: determine that the touchpad is not being touched; at least on condition of determining that the touchpad is not being touched, calculate a no-touch capacitance value of the PCB; after calculating the no-touch capacitance value, determine that the touchpad is being touched; and at least on condition that the touchpad is being touched, use the no-touch capacitance value and a touch-based capacitance value to estimate a force F exerted on the touchpad. The computing device may additionally or alternatively include, the instructions executable to: after determining that the touchpad is being touched, determine the touchpad is not being touched; and at least on condition that the touchpad is not being touched, recalculate the no-touch capacitance value to a recalculated no-touch capacitance value. The computing device may additionally or alternatively include, the instructions executable to: after recalculating the no-touch capacitance value, determine the touchpad is being touched; and at least on condition that the touchpad is being touched, use the recalculated no-touch capacitance value and another touch-based capacitance value to estimate the force F exerted on the touchpad. The computing device may additionally or alternatively include, wherein the no-touch capacitance value of the PCB comprises a sum of a no-touch PCB capacitance of the PCB and a no-touch pad capacitance of the capacitive force sensing electrode. The computing device may additionally or alternatively include, the instructions executable to: while the touchpad is being touched, calculate a measured change in capacitance by subtracting the no-touch capacitance value from the touch-based capacitance value; and use the measured change in capacitance to estimate the force F exerted on the touchpad. The computing device may additionally or alternatively include, wherein the PCB comprises a shielded electrode located between a first shielding layer and a second shielding layer to substantially isolate the shielded electrode from changes in capacitance caused by movement of the PCB, the instructions executable to: calculate an environmental change in capacitance at the shielded electrode; use the environmental change in capacitance to adjust the measured change in capacitance to an adjusted measured change in capacitance; and use the adjusted measured change in capacitance to estimate the force F exerted on the touchpad. The computing device may additionally or alternatively include, wherein a capacitance measuring circuit of the PCB comprises a reference capacitor, and the touch-based capacitance value is a touch-based capacitance change value, the instructions executable to, at least on condition of determining that the touchpad is not being touched, utilize the reference capacitor to calculate the no-touch capacitance value of the PCB. The computing device may additionally or alternatively include, wherein the PCB comprises a shielded electrode located between a first shielding layer and a second shielding layer to substantially isolate the shielded electrode from changes in capacitance caused by movement of the PCB, the instructions executable to: calculate an environmental change in capacitance at the shielded electrode; use the environmental change in capacitance to adjust a calibrated touch-based capacitance change value to an adjusted calibrated touch-based capacitance change value; and use the adjusted calibrated touch-based capacitance change value to estimate the force F exerted on the touchpad.

Another aspect provides a computing device, comprising: a force sensing touchpad comprising: a base plate comprising a base electrode; and a printed circuit board (PCB) resiliently spaced from the baseplate and comprising a capacitive force sensing electrode; a processor; and a memory storing instructions executable by the processor to: determine that the touchpad is not being touched; at least on condition of determining that the touchpad is not being touched, calculate a no-touch capacitance value of the PCB; after calculating the no-touch capacitance value of the PCB, determine that the touchpad is being touched; while the touchpad is being touched, calculate a first measured change in capacitance by subtracting the no-touch capacitance value of the PCB from a first touch-based capacitance value; use the first measured change in capacitance to estimate a first force F exerted on the touchpad; after determining that the touchpad is being touched, determine the touchpad is not being touched; at least on condition that the touchpad is not being touched, recalculate the no-touch capacitance value to a recalculated no-touch capacitance value; after recalculating the no-touch capacitance value, determine the touchpad is being touched; while the touchpad is being touched, calculate a second measured change in capacitance by subtracting the recalculated no-touch capacitance value from a second touch-based capacitance value; use the second measured change in capacitance to estimate a second force F exerted on the touchpad.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method for estimating a force F exerted on a touchpad in a computing device, the touchpad comprising a printed circuit board (PCB) comprising a capacitive force sensing electrode and a capacitance measuring circuit that comprises a reference capacitor, the method comprising:

determining that the touchpad is not being touched;

at least on condition of determining that the touchpad is not being touched, utilizing the reference capacitor to calculate a no-touch capacitance value of the PCB by calculating a calibration factor, wherein calculating the calibration factor comprises dividing a known increase in capacitance that results from adding the reference capacitor into the capacitance measuring circuit by a no-touch capacitance change value, wherein the no-touch capacitance change value is calculated by subtracting a no-reference no-touch capacitance value measured without the reference capacitor in the capacitance measuring circuit from a reference no-touch capacitance value measured with the reference capacitor in the capacitance measuring circuit;

after calculating the no-touch capacitance value, determining that the touchpad is being touched; and at least on condition that the touchpad is being touched, using the no-touch capacitance value and a touch-based capacitance change value to estimate the force F exerted on the touchpad.

2. The method of claim 1, further comprising:

after determining that the touchpad is being touched, determining the touchpad is not being touched; and at least on condition that the touchpad is not being touched, recalculating the no-touch capacitance value to a recalculated no-touch capacitance value.

3. The method of claim 2, further comprising:

after recalculating the no-touch capacitance value, determining the touchpad is being touched; and at least on condition that the touchpad is being touched, using the recalculated no-touch capacitance value and another touch-based capacitance change value to estimate the force F exerted on the touchpad.

4. The method of claim 1, wherein the no-touch capacitance value of the PCB comprises a sum of a no-touch PCB capacitance of the PCB and a no-touch pad capacitance of the capacitive force sensing electrode.

5. The method of claim 1, further comprising:

while the touchpad is being touched, calculating a measured change in capacitance by subtracting the no-touch capacitance value from the touch-based capacitance change value; and using the measured change in capacitance to estimate the force F exerted on the touchpad.

6. The method of claim 1, wherein the PCB comprises a shielded electrode located between a first shielding layer and a second shielding layer to substantially isolate the shielded electrode from changes in capacitance caused by movement of the PCB, the method further comprising:

calculating an environmental change in capacitance at the shielded electrode;

using the environmental change in capacitance to adjust a calibrated touch-based capacitance change value to an adjusted calibrated touch-based capacitance change value; and using the adjusted calibrated touch-based capacitance change value to estimate the force F exerted on the touchpad.

7. The method of claim 6, wherein using the environmental change in capacitance to adjust the calibrated touched-based capacitance change value comprises subtracting the environmental change in capacitance from a calibrated touched-based capacitance change value.

8. The method of claim 1, wherein the reference capacitor comprises a temperature-stable reference capacitor.

9. The method of claim 1, further comprising selectively switching the reference capacitor into the capacitance measuring circuit of the PCB.

10. The method of claim 1, further comprising:
    after determining that the touchpad is being touched, determining the touchpad is not being touched; and
    at least on condition that the touchpad is not being touched, recalculating the calibration factor to a recalculated calibration factor.

11. A computing device, comprising:
    a force sensing touchpad comprising:
        a base plate comprising a base electrode; and
        a printed circuit board (PCB) resiliently spaced from the baseplate and comprising a capacitive force sensing electrode and a capacitance measuring circuit that comprises a reference capacitor;
    a processor; and
    a memory storing instructions executable by the processor to:
        determine that the touchpad is not being touched;
        at least on condition of determining that the touchpad is not being touched, utilizing the reference capacitor to calculate a no-touch capacitance value of the PCB by calculating a calibration factor, wherein calculating the calibration factor comprises dividing a known increase in capacitance that results from adding the reference capacitor into the capacitance measuring circuit by a no-touch capacitance change value, wherein the no-touch capacitance change value is calculated by subtracting a no-reference no-touch capacitance value measured without the reference capacitor in the capacitance measuring circuit from a reference no-touch capacitance value measured with the reference capacitor in the capacitance measuring circuit;
        after calculating the no-touch capacitance value, determine that the touchpad is being touched; and
        at least on condition that the touchpad is being touched, use the no-touch capacitance value and a touch-based capacitance change value to estimate a force F exerted on the touchpad.

12. The computing device of claim 11, the instructions executable to:
    after determining that the touchpad is being touched, determine the touchpad is not being touched; and
    at least on condition that the touchpad is not being touched, recalculate the no-touch capacitance value to a recalculated no-touch capacitance value.

13. The computing device of claim 12, the instructions executable to:
    after recalculating the no-touch capacitance value, determine the touchpad is being touched; and
    at least on condition that the touchpad is being touched, use the recalculated no-touch capacitance value and another touch-based capacitance change value to estimate the force F exerted on the touchpad.

14. The computing device of claim 11, wherein the no-touch capacitance value of the PCB comprises a sum of a no-touch PCB capacitance of the PCB and a no-touch pad capacitance of the capacitive force sensing electrode.

15. The computing device of claim 11, the instructions executable to:

while the touchpad is being touched, calculate a measured change in capacitance by subtracting the no-touch capacitance value from the touch-based capacitance change value; and
use the measured change in capacitance to estimate the force F exerted on the touchpad.

16. The computing device of claim 15, wherein the PCB comprises a shielded electrode located between a first shielding layer and a second shielding layer to substantially isolate the shielded electrode from changes in capacitance caused by movement of the PCB, the instructions executable to:
    calculate an environmental change in capacitance at the shielded electrode;
    use the environmental change in capacitance to adjust a calibrated touch-based capacitance change value to an adjusted calibrated touch-based capacitance change value; and
    use the adjusted calibrated touch-based capacitance change value to estimate the force F exerted on the touchpad.

17. The computing device of claim 16, wherein using the environmental change in capacitance to adjust the calibrated touched-based capacitance change value comprises subtracting the environmental change in capacitance from a calibrated touched-based capacitance change value.

18. The computing device of claim 11, wherein the reference capacitor comprises a temperature-stable reference capacitor.

19. The computing device of claim 11, the instructions executable to selectively switch the reference capacitor into the capacitance measuring circuit of the PCB.

20. A computing device, comprising:
    a force sensing touchpad comprising:
        a base plate comprising a base electrode; and
        a printed circuit board (PCB) resiliently spaced from the baseplate and comprising a capacitive force sensing electrode and a capacitance measuring circuit that comprises a reference capacitor;
    a processor; and
    a memory storing instructions executable by the processor to:
        determine that the touchpad is not being touched;
        at least on condition of determining that the touchpad is not being touched, utilizing the reference capacitor to calculate a no-touch capacitance value of the PCB by calculating a calibration factor, wherein calculating the calibration factor comprises dividing a known increase in capacitance that results from adding the reference capacitor into the capacitance measuring circuit by a no-touch capacitance change value, wherein the no-touch capacitance change value is calculated by subtracting a no-reference no-touch capacitance value measured without the reference capacitor in the capacitance measuring circuit from a reference no-touch capacitance value measured with the reference capacitor in the capacitance measuring circuit;
        after calculating the no-touch capacitance value, determine that the touchpad is being touched;
        while the touchpad is being touched, calculate a first measured change in capacitance by subtracting the no-touch capacitance value from a first touch-based capacitance change value;
        use the first measured change in capacitance to estimate a first force F exerted on the touchpad;

after determining that the touchpad is being touched, determine the touchpad is not being touched;

at least on condition that the touchpad is not being touched, recalculate the no-touch capacitance value to a recalculated no-touch capacitance value;

after recalculating the no-touch capacitance value, determine the touchpad is being touched;

while the touchpad is being touched, calculate a second measured change in capacitance by subtracting the recalculated no-touch capacitance value from a second touch-based capacitance change value; and use the second measured change in capacitance to estimate a second force F exerted on the touchpad.

\* \* \* \* \*